United States Patent [19]

Omura et al.

[11] Patent Number: 5,095,383
[45] Date of Patent: Mar. 10, 1992

[54] OPTICAL UNIT FOR USE IN A LASER BEAM PRINTER OR THE LIKE

[75] Inventors: Ken Omura; Takashi Shiraishi, both of Tokyo, Japan

[73] Assignee: Kabushiki Kaisha Toshiba, Kawasaki, Japan

[21] Appl. No.: 587,726

[22] Filed: Sep. 25, 1990

[30] Foreign Application Priority Data

Sep. 29, 1989 [JP] Japan .................................. 1-254911

[51] Int. Cl.$^5$ ............................................. G02B 26/08
[52] U.S. Cl. .................................... 359/216; 359/217; 359/196; 250/236
[58] Field of Search ................... 350/6.1, 6.5, 6.6, 6.7, 350/6.8, 6.9, 6.91; 250/234, 235, 236

[56] References Cited

U.S. PATENT DOCUMENTS

| | | | |
|---|---|---|---|
| 3,961,838 | 6/1976 | Zanoni ................................. | 359/217 |
| 4,758,059 | 7/1988 | Sakuma ............................... | 359/217 |
| 4,875,748 | 10/1989 | Matsumoto et al. ................ | 359/217 |
| 4,984,857 | 1/1991 | Yeung et al. ........................ | 359/213 |

*Primary Examiner*—Loha Ben
*Attorney, Agent, or Firm*—Foley & Lardner

[57] ABSTRACT

In an optical unit incorporated in a laser beam printer, a laser beam generated by a laser diode is converted by a group of conversion lenses into a laser beam having a predetermined-size cross section. The laser beam is directed toward a photosensitive body by a scanner unit, so as to scan the photosensitive body. A focusing lens allows the rotating angle of the reflecting faces of the scanner unit to correspond to a desirable point on the surface of the photosensitive body. In other words, the rotating angle is made to correspond to the distance between the optical axis center determined with respect to a main scanning direction and a point to which the laser beam is irradiated for scanning. Each of the reflecting faces is convex. The focusing lens is constituted by an aspheric-surface plastic lens having a toric surface which is rotation-symmetric with reference to an axis extending in the main scanning direction. The rotating speed of the convex mirrors of the scanner unit is determined in accordance with the characteristics of the focusing lens. Therefore, both the field curve and the f$\theta$ characteristic can be corrected.

10 Claims, 9 Drawing Sheets

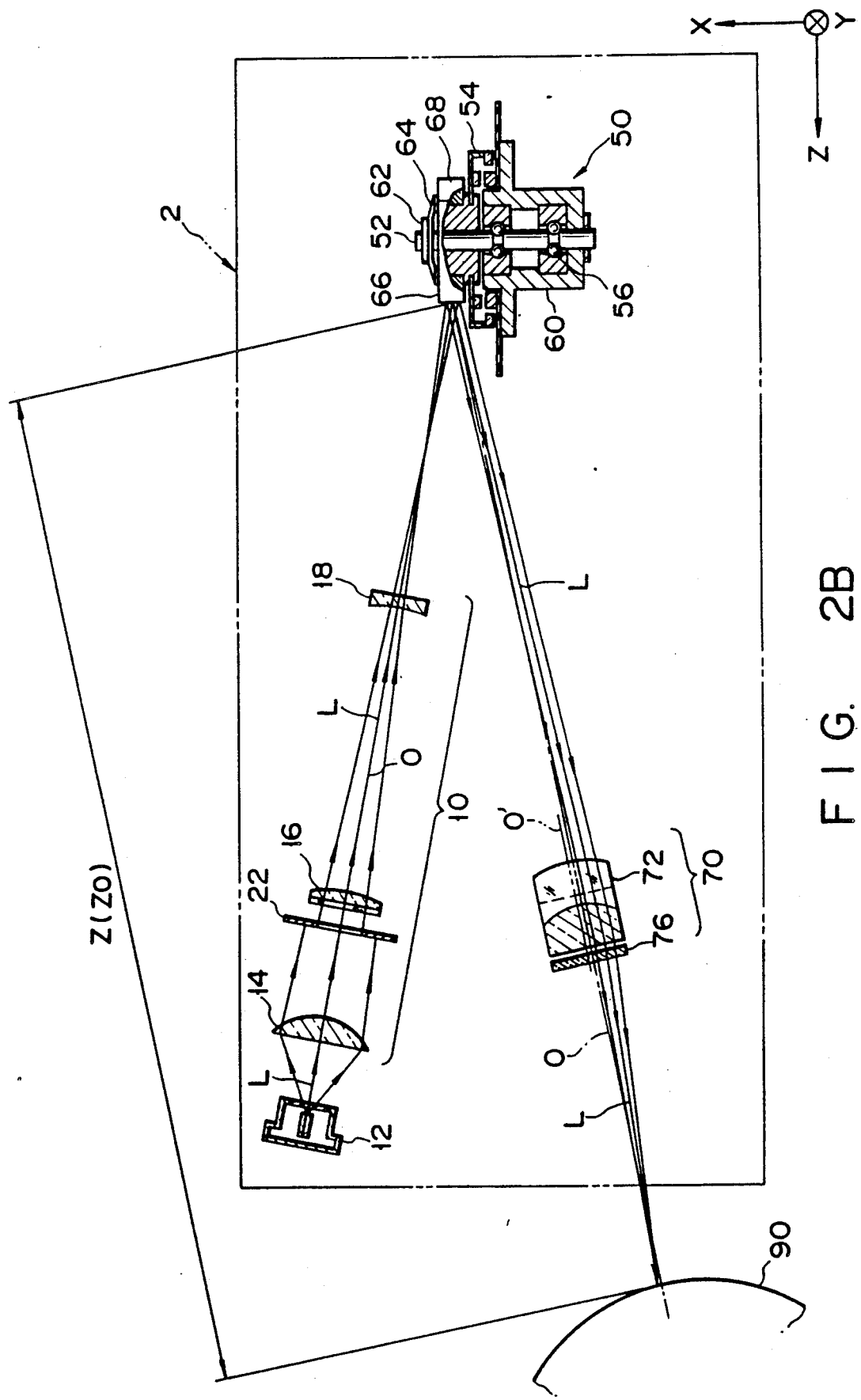
F I G. 2B

OPTICAL UNIT FOR USE IN A LASER BEAM PRINTER OR THE LIKE

Background of the Invention

1. Field of the Invention

The present invention relates to an optical unit for use in a laser beam printer, and more particularly to an optical unit which guides a laser beam from a laser diode to an object to be scanned, by way of a group of focusing lenses and a scanner.

2. Description of the Related Art

In general, an optical unit incorporated in a laser beam printer or the like is designed such that a laser beam generated from a laser diode is guided first to a scanner, i.e., an optical deflector, and then to a photosensitive body. The photosensitive body is scanned with the laser beam at a constant speed. Before reaching the photosensitive body, the laser beam passes through a group of focusing lenses, by which the laser beam is made to have a cross section of desirable size and is focused on the photosensitive body.

In this type of optical unit, the focusing lenses are assembled as first and second optical systems isolated from each other. The first optical system converges the laser beam generated by the laser diode and simultaneously provides the laser beam with desirable characteristics. The second optical device focuses the laser beam to a desirable point on the surface of the photosensitive body. The scanner is located between the first and second optical systems.

The first optical system is a combination of lenses, such as an aspheric glass lens, a plastic lens, etc. The second optical system is a combination of lenses, such as an fθ lens. By this fθ lens, the deflection angle at which a laser beam is deflected by the scanner is changed in proportion to the position at which the laser beam is focused on the photodetector and which is expressed in relation to the main scanning direction.

U.S. Pat. No. 3,961,838 discloses an optical unit which is of a similar type to that mentioned above. The second optical system of the optical unit of this U.S. patent employs a lens which satisfies h=kΘ, where h is the distance between the major component of an output laser beam and the optical axis of the lens, k is a constant which is substantially equal to the focal length of the lens, Θ is the distance between the major component of an input laser beam and the optical axis of the lens.

In the optical unit of the U.S. Pat. No., the fθ characteristics are improved by combining a large number of lenses. Due to the use of a large number of lenses, the optical u it is complex in structure and is not easy to assemble or adjust. In addition, the optical unit is inevitably large in size.

SUMMARY OF THE INVENTION

Accordingly, an object of the present invention is to provide an optical unit which enables simultaneous correction of both the fθ characteristic and the field curve.

Another object of the present invention is to provide an optical unit which can be manufactured at low cost.

A further object of the present invention is to provide an optical unit which is compact in size.

The present invention provides an optical unit which is to be incorporated in a laser beam printer or the like and which comprises: means for generating a light beam; means, including a reflecting face which is convex in a main scanning direction, for reflecting the light beam generated from the converting means toward an object in accordance with the rotation of the reflecting face, such that the object is scanned with the light beam at a nonuniform angular velocity; and means for shaping the light beam to have a cross section of a predetermined diameter, directing the light beam to the object in correspondence to the rotating angle of the reflecting face, and maintaining the light beam to have substantially the same cross section.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

Brief Description of the Drawings

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2B is a sectional view showing the laser beam paths, the sectional view being obtained by taking the plan view shown in FIG. 2A along a plane which is in the vicinity of a center determined with reference to a main scanning direction;

DETAILED DESCRIPTION OF THE PREFERRED EMBODIMENT

An embodiment of the present invention will now be described, with reference to the accompanying drawings.

Figure 1A:
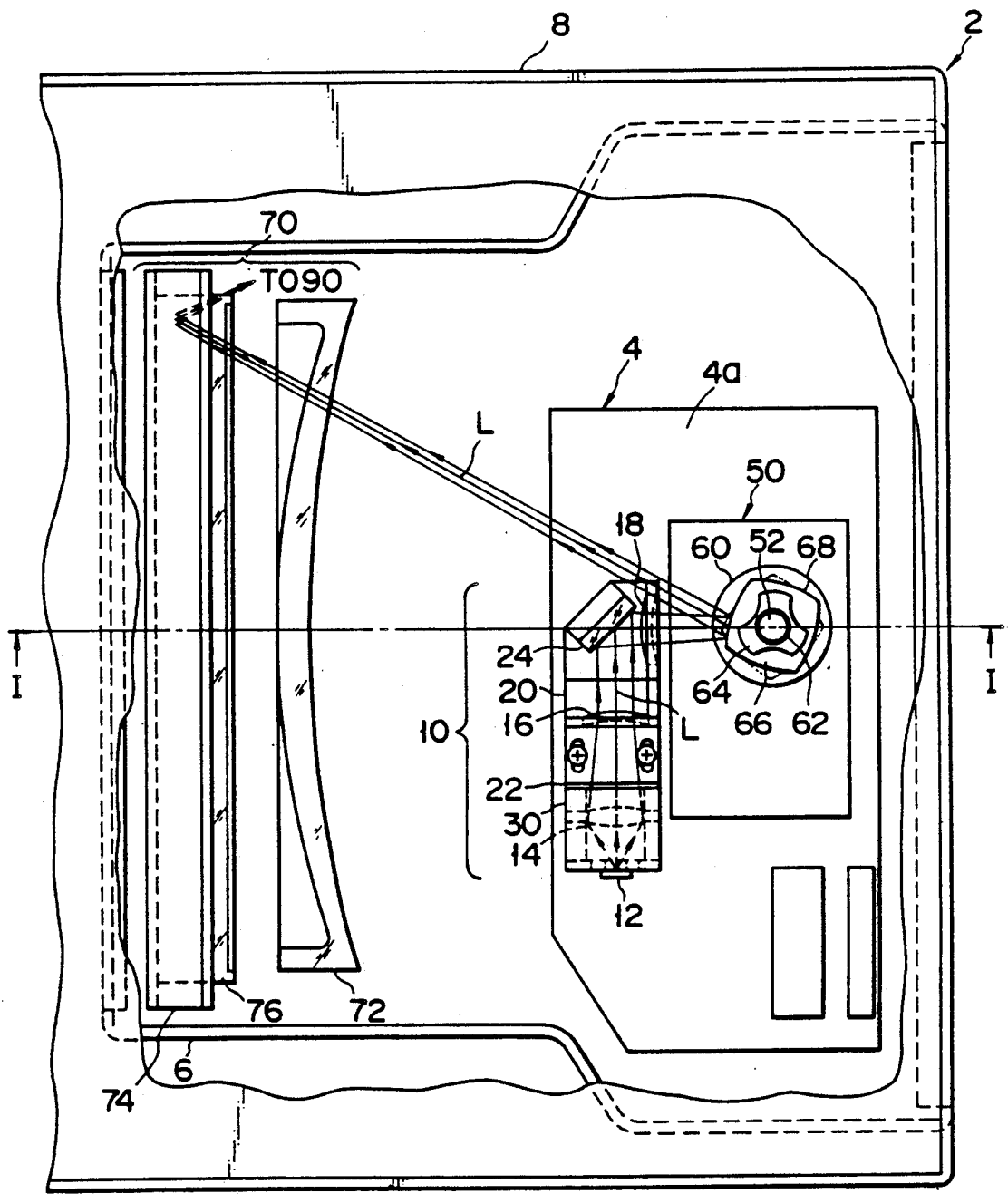
FIG. 1A is a plan view of an optical unit according to one embodiment of the present invention.
Figure 1B:
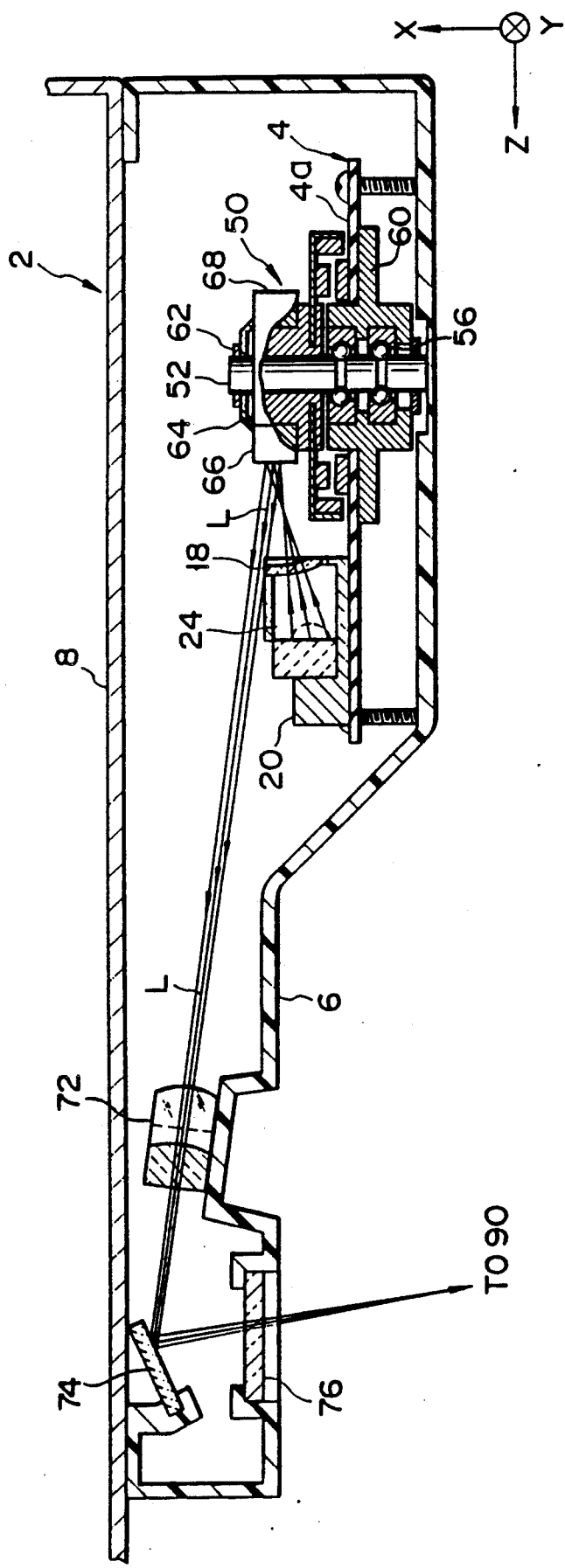
FIG. 1B is a sectional view taken along line I—I in FIG. 1.
Figure 2A:
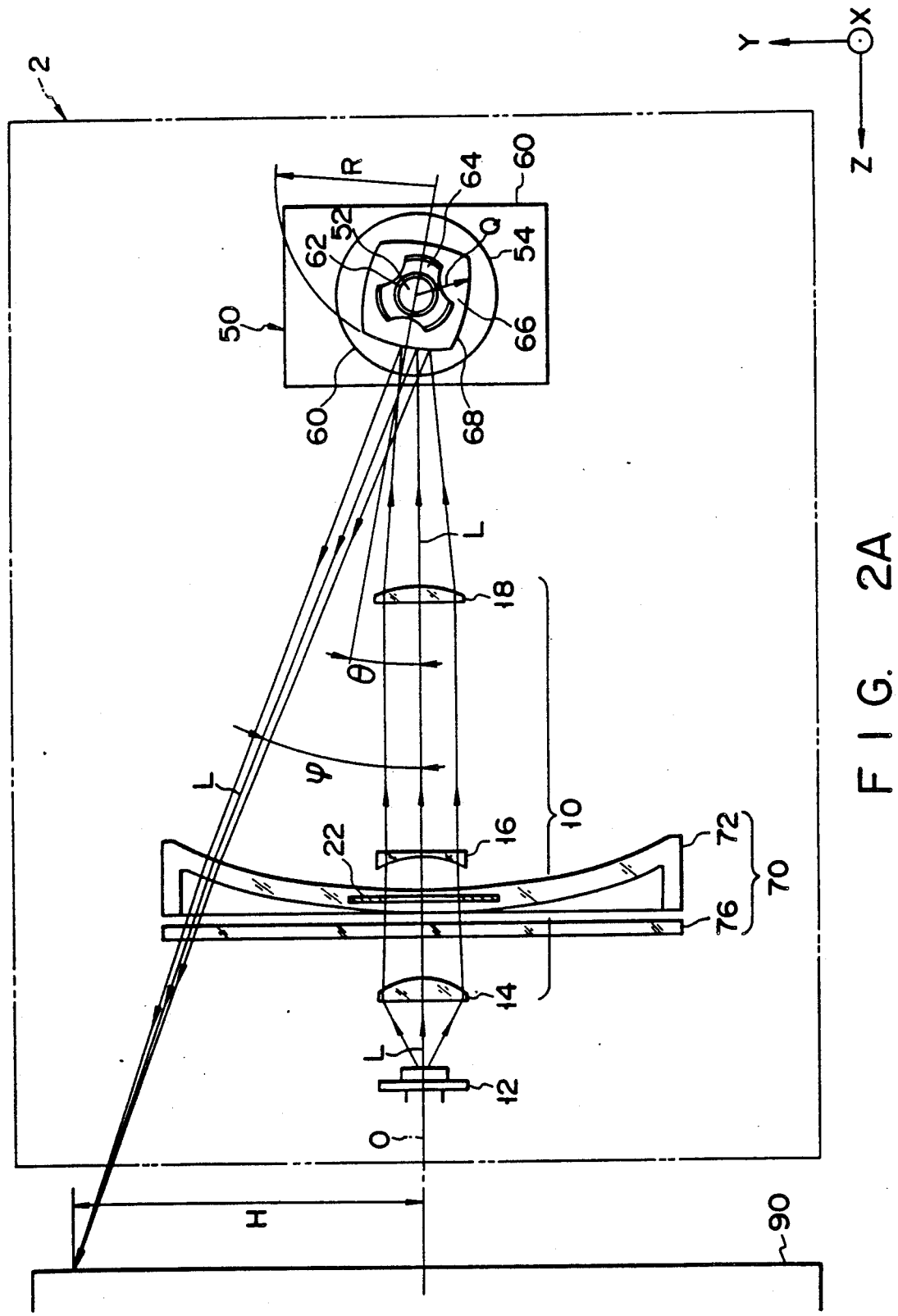
FIG. 2A is a plan view showing the arrangement of optical components of the optical unit, along with laser beam paths.

As is shown in FIGS. 1A and 1B, an optical unit 2 is provided with an outer housing 6 and a base plate 8. The base plate 8 covers the outer housing 6 and seals the interior of the outer housing 6. The base plate 8 constitutes part of a laser beam printer. The optical unit 2 contains: a laser diode 12 for generating a laser beam L; a laser scanning device 4 made up of a first optical system 10 and a scanner 50 which are integrally arranged; and a second optical system 70. The first optical system 10 includes a group of conversion lenses, while the second optical system 70 includes a group of focusing lenses. Although not shown, the optical unit 2 further contains a monitoring optical device which monitors whether or not a laser beam L, guided through the first and second optical systems 10 and 70 and used for scanning a photosensitive body 90, is horizontally synchronized.

Figure 3A:
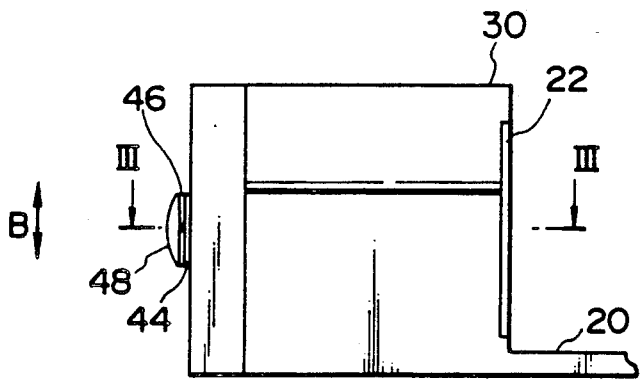
FIG. 3A is a side view of a lens barrel which is to be incorporated in the optical unit shown in FIGS. 1A and 1B and by which a focusing optical system, a light source, etc. are secured.
Figure 3B:
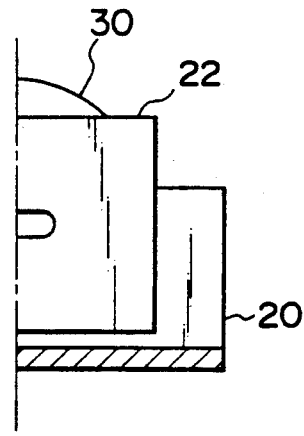
FIG. 3B is a right side view of the lens barrel shown in FIG. 3A.
Figure 3C:
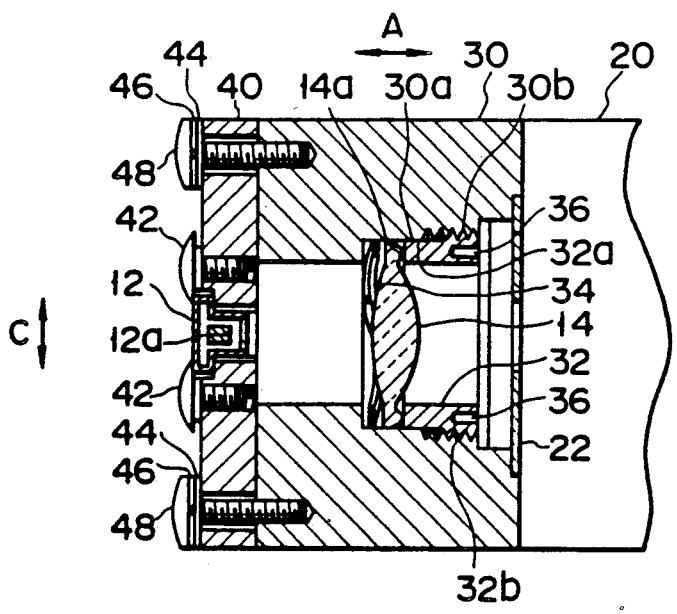
FIG. 3C is a sectional view taken along line III—III shown in FIG. 3A.

The laser scanning device 4 is mounted on an insulating base 4a. This insulating base 4a need not be used if the outer housing 6 is formed of an insulating material. As is shown in FIGS. 3A–3C, the laser diode 12 and at least one lens of the first optical system 10 are assembled in such a manner as to constitute a lens barrel.

The laser beam L generated by the laser diode 12 is converged when it passes through the first optical system 10. The laser beam L is directed to the scanner 50, by which the laser beam L is reflected toward the photosensitive body 90, for scanning it at a nonuniform angular velocity. The laser beam L reflected by the scanner 50 is directed first to the second optical system 70. The laser beam L is focused on a desirable point on the surface of the photosensitive body 90 by the second optical system 70. The laser beam L moves over the photosensitive body 90 in the main scanning direction, with keeping the focused condition due to the second optical system 70, as the reflecting surface of the scanner 50 rotates. The distance over which the laser beam L moves in the main scanning direction from the center of the optical axis to a given point is made to correspond to the angle at which the surface of the scanner 50 rotates. The laser beam L, focused on the photosensitive body 90, is modified or ON-OFF controlled by additional units such as a beam modulator, a data input circuit, etc., (not shown) to form character data and/or graphics data on the surface of the photosensitive body 90. Therefore, an electrostatic latent image is formed on the surface of the photosensitive body 90.

The photosensitive body 90 is rotated in a predetermined direction by a driver (not shown). The electrostatic latent image is formed in accordance with the rotation of the photosensitive body 90. The electrostatic latent image, thus formed, is developed by a developing means (not shown), and is then transferred onto a given transferring material (not shown).

Part of the laser beam L passing through the second optical system 70 is reflected by a horizontal synchronization-detecting mirror (not shown) at each scan performed in the main scanning direction. The reflected laser beam L is guided to a synchronization signal detector (not shown), for the detection of horizontal synchronization.

The first optical system 10 includes: a glass lens 14 which slightly converges the laser beam L produced by the laser diode 12; and first and second plastic lenses 16 and 18 which further converge the laser beam converged by the glass lens 14.

The glass lens 14 is a convex lens formed of optical glass, such as BK7, SK10, etc. As is seen in FIGS. 3A–3C, it has a flange 14a by means of which it is held to a housing 20 (lens barrel 30). The first plastic lens 16 is formed of, polymethyl methacrylate (PMMA), etc., and has toric surfaces. The toric surfaces have negative power in the main scanning direction and slightly-negative power in the sub-scanning direction. Although not shown, the first plastic lens 16 has a flange by means of which it is attached to a housing 20. It also has either a positioning-projection or a positioning-recess formed substantially at the center with respect to the main scanning direction.

Like the first plastic lens 16, the second plastic lens 18 is formed of PMMA, etc. It has toric surfaces. The toric surfaces which have positive power in the main scanning direction and negative power in the subscanning direction. Although not shown, the second plastic lens 18 has a flange by means of which it is attached to the housing 20. It also has either a positioning-projection or a positioning-recess formed substantially at the center with respect to the main scanning direction.

The scanner 50 includes a polygonal mirror 66 having a plurality of deflecting mirrors 68. Each deflecting mirror 68 which is convex in the main scanning direction, i.e., the deflecting mirror 68 is curved with a predetermined radius R of curvature. The number of deflecting mirrors 68 is four in this embodiment, but may be a multiple of four. The polygonal mirror 66 is driven by an axial gap type motor 60. This motor 60 contains: a rotor 54 which is integral with the rotating shaft 52 of the motor 60; a direct bearing 56 which supports the rotating shaft 52 in such a manner as to allow smooth rotation; etc. The polygonal mirror 66 is reliably fixed to the rotor 54 by means of a stop ring 62 and a spring member 64.

The second optical system 70 includes a third plastic lens 72 for focusing a laser beam L on the surface of the photosensitive body 90, and a dust-preventing cover 76 for sealing the abovementioned optical members of the optical unit 2. With respect to the main scanning direction, the third plastic lens 72 has a face which is shaped to satisfy the relation expressed by $H=f\theta$. In other words, the distance over which the laser beam L ought to move from the optical axis in the main scanning direction in proportion to the angle $\theta$, at which the polygonal mirror 66 or each mirror 68 thereof is rotated, is made to correspond to the distance H for which the laser beam L scans the photosensitive body 90 in the main scanning direction from the center of the optical axis. With respect to the sub-scanning direction, the third plastic lens 72 functions as a kind of $f\theta$ lens which has positive power and which is curved such that the power decreases in accordance with an increase in the deflection angle $\Phi$ with respect to the main scanning direction. Like the first plastic lens 16, the third plastic lens 72 is formed of PMMA, etc., and has either a positioning-projection or a positioning-recess (not shown) formed substantially in the center with respect to the main scanning direction.

The dust-preventing cover 76 is a transparent glass or plastic plate. It is formed of optical plate, such as BK7, filter glass, PMMA, or the like. It has a thickness of 2–3 mm, and permits the laser beam L to pass therethrough. In order to cut off a light having such a wavelength as adversely affects the photosensitive body 90, the dust-preventing cover 76 may be provided with a sharp cut filter function.

In the optical unit 2, the first optical system 10 and the second optical system 70 are arranged such that their optical axes form a predetermined angle in a plane expanding in the sub-scanning direction. This arrangement is adopted for the purpose of eliminating ghost laser beam 1 to be mentioned later. The laser diode 12 and lenses 14, 16 and 18 of the first optical system 10 are integrally assembled together and are held by the housing 20. The housing 20 contains the lens barrel 30 which will be detailed later with reference to FIGS. 3A-3C. A stop 22 which restricts the intensity or amount of convergent laser beam L, and a first mirror 24 which is arranged between the first and second plastic lenses 16 and 18 to change the traveling direction of the laser beam L, are also held by the housing 20. It should be noted that a second mirror 74 is arranged between the third plastic lens 72 and the dust-preventing cover 76, so as to change the traveling direction of the laser beam L.

The laser beam L generated by the laser diode 12 is converged or collimated by the glass lens 14. When passing through the stop 22, the laser beam L is shaped to have a predetermined cross section. The laser beam L emerging from the stop 22 is guided to the first plastic lens 16. When passing through the first plastic lens 16, the laser beam L is collimated in the main scanning direction and is converged in the sub-scanning direction. The laser beam L, thus processed, is then directed to the second plastic lens 18 via the first mirror 24, as is seen in FIGS. 1A and 1B. When passing through the second plastic lens 18, the laser beam L is converged in both the main scanning direction and subscanning direction.

The laser beam L emerging from the second plastic lens 18 is directed to one deflecting mirror 68 of the polygonal mirror 66 of the scanner 50. After being reflected by the deflecting mirror 68, the laser beam L is directed at a nonuniform angular velocity to the third plastic lens 72, which functions as a kind of fθ lens, as mentioned above. In the main scanning direction, the third plastic lens 72 suppresses the adverse effects caused by the field curve and corrects the distortion aberration to have a desirable value. In the subscanning direction, the third plastic lens 72 corrects the positional shift of the laser beam L on the photosensitive body 90, even if each mirror 68 of the polygonal mirror 66 tilts. The laser beam L emerging from the third plastic lens 72 is directed to the photosensitive body 90 by way of the dustpreventing cover 76 which is mounted on the housing 6 of the optical unit 2.

The lenses 14, 16, 18, and 72 and the Scanner 50 used in the embodiment have such optical characteristics as are shown in Tables 1 and 2 below.

TABLE 1

| | (Lens characteristics with respect to main scanning direction) | | | | |
|---|---|---|---|---|---|
| | First Focusing System | | | | Second Focusing System Lens 72 |
| | Glass lens 14 | Lens 16 | Lens 18 | Polygonal Mirror 66 | |
| i | −1 | 2 | 3 | 4 | 5 |
| Power P | 0.0907035 | −0.0134704 | 0.0134029 | −0.025109855 | $9.92445 \times 10^{-4}$ |
| Focal Length f | 11.0294 | −74.2368 | 74.6107 | −39.825 | $-1.00761 \times 10^{3}$ |

TABLE 2

| | (Lens characteristics with respect to main scanning direction) | | | | |
|---|---|---|---|---|---|
| | First Focusing System | | | | Second Focusing System Lens 72 |
| | Glass lens 14 | Lens 16 | Lens 18 | Polygonal Mirror 66 | |
| i | −1 | 2 | 3 | 4 | 5 |
| Power P | 0.0907035 | −0.00094897 | −0.0530289 | 0.0 | −0.0221932 |
| Focal Length f | 11.0294 | −1053.-77 | −18.8576 | ∞ | 45.0588 |

Next, a description will be given of a structure used for converting the laser beam L generated by the laser into a laser beam L having a cross section of desirable size.

Referring to FIGS. 3A-3C, the glass lens 14 is secured to the lens barrel 30 by means of a push member 32 and an elastic member 34 for example a wave washer, etc. The push member 32 includes a cylindrical portion 32a and a screw portion 32b. The cylindrical portion 32a has a pressing part on that side which contacts the glass lens 14. The position of the glass lens 14 can be adjusted in the direction indicated by arrow A by turning the push member 32. The glass lens 14 has a flange 14a. Since this flange 14a and the pressing part of the cylindrical portion 32a are in line contact with each other, the torque required for turning the push member 32 is small. On the opposite side of the pressing part, a hole 36 is formed in the push member 32. When the position of the glass lens 14 is adjusted, a specially-designed tool is inserted into the hole 36, and the push member 32 is turned by use of the tool. The wave washer 34 urges the glass lens 14 toward the push member 32, and this urging force is constantly applied to the screw portion 32b of the push member 32. Therefore, unnecessary play is not produced between the screw portion 32b of the push member 32 and the thread of the screw portion 30b of the lens barrel 30. In this fashion, the glass lens 14 is accurately secured to the predetermined position of the lens barrel 30.

The laser diode 12 is fixed to a laser diode holder 40 by means of a screw 42. The position of the laser diode holder 40 can be adjusted in the directions indicated by arrows B and C, so that the laser diode holder 40 can be positioned in a desirable manner with reference to the lens barrel 30. The laser diode holder 40 is pressed against the lens barrel 30 with desirable pressure by means of a spring washer 44, a flat washer 46, and a screw 48. With this structure, the direction in which the major component of the laser beam L of the laser diode 12 is emitted can be easily adjusted with reference to the optical axis of the glass lens 14.

Figure 4:
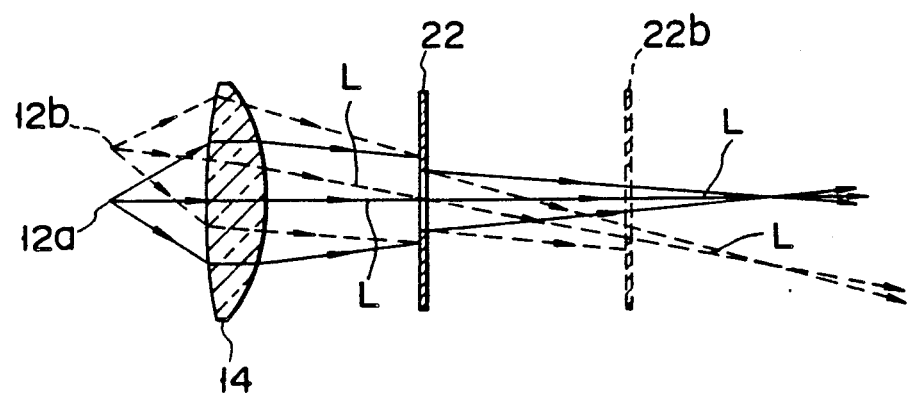
FIG. 4 is a schematic sectional view showing the positional relationship between the lens barrel shown in FIGS. 3A–3C and a stop used for restricting the amount of laser beam generated by a laser.
Figure 5:
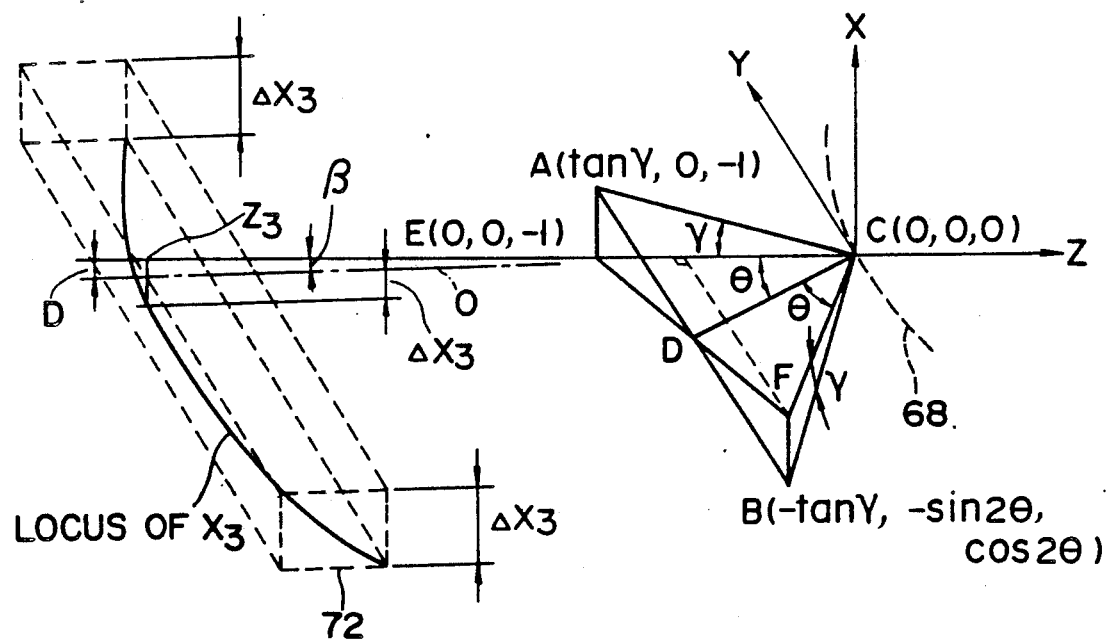
FIG. 5 is a vector diagram showing the characteristics of a laser beam which passes through a scanner incorporated in the optical unit shown in FIGS. 1A and 1B, the characteristics of the laser beam being indicated in relation to the angle formed between a normal line to a mirror and a laser beam incident on the mirror.

Referring to FIG. 4, a laser beam L is generated from the laser-emitting point 12a of the diode laser 12. The laser beam is converged by the glass lens 14 and restricted by the stop 22 located at the rear-focal plane of the glass lens 14, in such a manner that the laser beam L can form a beam spot of predetermined size. Thereafter, the laser beam L is directed to the photosensitive body 90. Let it be assumed that the stop 22 is located at a position away from the rear-focal plane of the glass lens L, for example, at the position 22b indicated by the broken lines in FIG. 4. In this case, the amount of laser beam L passing through the stop 22 is greatly varied, depending upon the location of the laser-emiting point 12a of the laser diode 12. If the laser-emitting point 12a is shifted to the position indicated by 12b, the amount of laser beam L passing through the stop 22 reduces approximately to half. In other words, in the case where the stop 22 is located at the rear-focal plane of the glass lens 14, the intensity or amount of laser beam L directed to the photosensitive body 90 can remain substantially unchanged, even if the direction in which the major component of the laser beam L generated by the laser diode 12 and the optical axis of the glass lens 14 are shifted from each other.

A description will now be given as to how the characteristics of the laser beam L directed to the photosensitive body 90 from the lens barrel 30 are improved in the present invention.

In this type of optical system, it may happen that the reflecting mirrors of the scanner will not be held accurately at an intended angle (i.e., a so-called mirror tilting problem). If this happens, the point H to which a laser beam is actually irradiated is shifted from the right position h, due to the curvature of the fθ lens. As a result, the fθ characteristics is adversely affected. In addition, the field curvature (i.e., image distortion at the point h to which the laser beam should be irradiated) is also adversely affected. In order to improve the fθ characteristics and the field curvature, as well as other optical characteristics, the mirrors 68 of the polygonal mirror 66 are provided with an adequate curvature.

For example, the curvature of the mirrors 68 is represented by the formula below, if the angle of rotation of each mirror 68 is 0°, $$R/Z_0 = \{1/\cos\theta + \cos\theta/(1+\cos\theta) - 1\}$$

where:
θ is an angle at which the polygonal mirror 66, i.e., each mirror 68, is rotated;
Z is the distance between a given deflection point on a mirror 68 and the surface of the photosensitive body 90. The subscript θ of $Z_\theta$ denotes the corresponding angle of rotation of the polygonal mirror 66. If θ=0°, the above distance is represented by $Z_0$; and
R is a radius of curvature of each mirror 68.

In connection with the above equation, it should be noted that the value of R/Z0 is always greater than 0.5 without reference to the value of θ.

As is well known in the art, where the value of the $R/Z_O$ is greater than 0.5, the characteristics of the laser beam i.e., an image, irradiated onto the photosensitive body are adversely affected. That is, the fθ characteristic, the field curve, the distortion aberration, etc., are adversely affected.

The fθ characteristic will be explained. The fθ characteristic is the difference F between the following two: one is position H to which the laser beam L actually reaches and the other is the theoretical position h which the laser beam L reflected by the mirror 68 reaches. That is, the fθ characteristic F is given by:

$$F = (H - h) \times 100/h(\%)$$
$$= (H - f\theta) \times 100/f\theta(\%)$$

The fθ characteristic varies from "−" to "+" in accordance with an increase in the absolute value of the angle θ of rotation of the mirror 68. The symbols "−" and "+" used with the fθ characteristic indicate how H and h are related to each other in the Y-axis direction, i.e., in the main scanning direction (θ>0).

If H>h, the relationship is "+", and if H<h, the relationship is "−". As may be understood from this, the third plastic lens 72 should be an fθ lens which is specially shaped such that the power of the center portion of the lens is smaller than that of the circumferential portion. However, if such a special type of fθ lens is used, the field curve is inevitably shifted to the side of the polygonal mirror 66, noted the symbol "+" in accordance with an increase in the angle of rotation of the mirror 68. The symbols "+" and "−" used with the field curve indicate the direction in which the focus of the laser beam L directed to the photosensitive body 90 is shifted from a given reference position. If the focus of the laser beam L is shifted from the reference position toward the interior of the photosensitive body 90, the shifting direction is represented by "−". If the focus of the laser beam L is shifted from the reference position in the opposite direction, the shifting direction is represented by "+".

In the embodiment of the present invention, the values of R and $Z_O$ are determined as follows:

$$R = 79.65 \text{ mm}, Z_0 = 187.12 \text{ mm}$$

Therefore, the curvature of the mirrors 68 of the polygonal mirror 66 satisfies the relation $R/Z_O < 0.5$.

By combining the mirrors 68 and the third plastic lens 72 which satisfy the above equations, the field curve and fθ characteristic can be controlled to have adequate values with reference to the surface of the photosensitive body 90.

Figure 6:
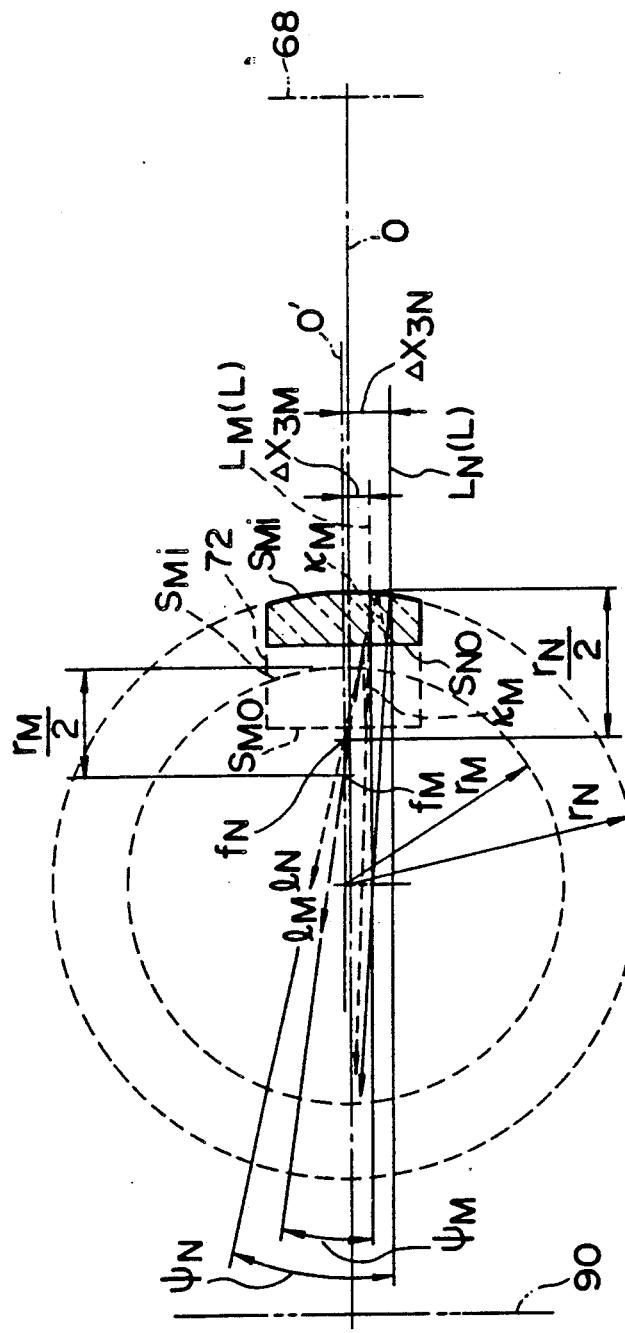
FIG. 6 is a schematic view showing the characteristics of the incident laser beam on a focusing lens incorporated in the optical unit shown in FIGS. 1A and 1B, the characteristics of the laser beam being indicated in relation to a main scanning direction.
Figure 7:
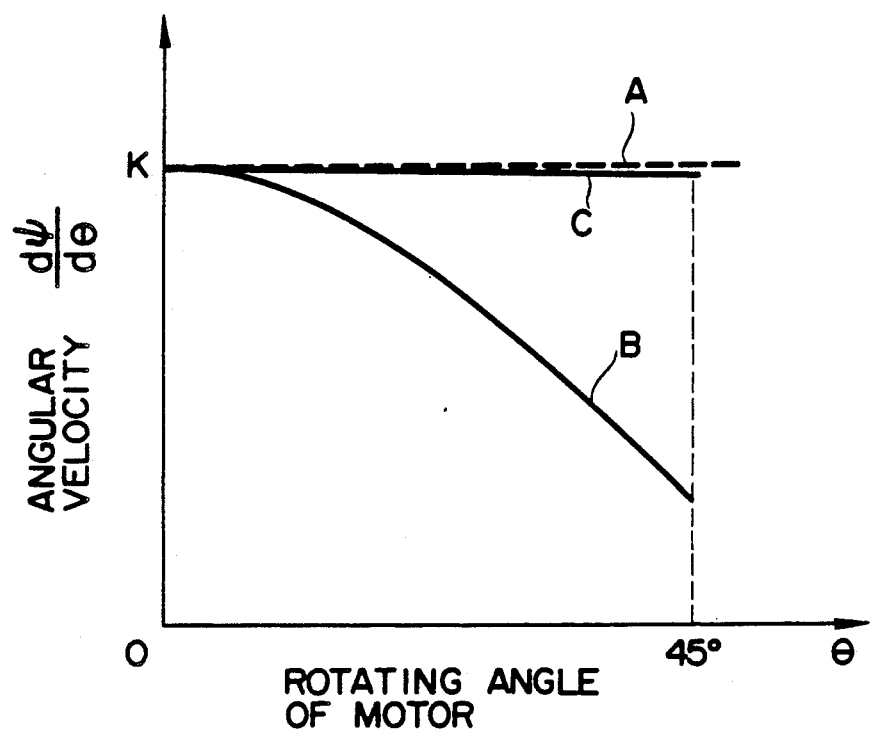
FIG. 7 is a graph of angular speed.

FIGS. 6 and 7 illustrate the reason why the ghost laser beam can be eliminated.

Let it be assumed that a line which is normal to a mirror 68 and which passes through a deflection point C (0, 0, 0) is represented by vector $\overline{CD}$, an incident laser beam is represented by vector $\overline{AC}$, and a reflected laser beam which forms angle 8 with reference to vectors $\overline{CD}$ and $\overline{CE}$ is represented by vector $\overline{CB}$ (the length of vector $\overline{CE}$ = the length of vector $\overline{CF}$ = 1), as is shown in FIG. 6. In this case, reflected laser beam obtained by projecting vector $\overline{CB}$ on an XZ plane is expressed as $(-\tan Y, -\sin 2\theta, -\cos 2\theta)$. If the third plastic lens 72 is arranged on the optical axis 0 having an angle β with respect to Z axis, and a projection that the position of the third plastic lens 72 on the optical axis 0 is projected onto the Z axis is denoted by $Z_3$, the intersection $X_3$ between the reflected laser beam vector $\overline{CB}$) and the third plastic lens 72 is expressed as follows:

$$X_3 = -Z_3 \tan\gamma / \cos 2\theta$$

As may be understood from the above, the displacement $\Delta X_3$, i.e., the distance from the reflected laser beam to the Z axis decreases (the absolute value of the deviation increases) in accordance with an increase in the angle $\theta$ of rotation of the mirror 68 ($\theta < 2/\pi$). A distance D between the Z axis and the optical axis 0 with respect to the position of the coordinates $Z_3$ is determined by $Z_3 \times \tan\beta$. With this in mind, the third plastic lens 72 is provided with a toric surface which can be rotated about an axis perpendicular to the main scanning plane, i.e., a Y axis. By so doing, the laser beam L is prevented from swaying or wavering eve if mirrors 68 tilt. In other words, the laser beam L is prevented from shifting from a point determined with respect to the main scanning direction.

Next, a description will be given of the relationship between a ghost laser beam and a position at which the laser beam L is incident on the third plastic lens 72 (the position being expressed as a distance for which it is located away from the optical axis).

In general, when a laser beam is incident on the first surface of a third plastic lens, it is refracted at a certain angle in the main scanning direction. The laser beam passes through the second surface of the lens, it is refracted in a direction different from the incident laser beam, directed toward a photosensitive body. It should be noted that part of the laser beam incident on the first surface is reflected by the second surface and is returned to the first surface again. Then, the returned laser beam is reflected by the first surface. This laser beam which is reflected twice appears as a ghost laser beam falling on the photosensitive body.

As is shown in FIG. 7, the third plastic lens 72 has different curvatures between the portion which is center in the main scanning direction and the portions which are peripheral in the main scanning direction. The third plastic lens 72 having these different curvatures is arranged such that the optical axis determined with respect to the sub-scanning direction is shifted toward the laser beam incident on each mirror 68.

The laser beam L is incident on the third plastic lens 72, the center of which is shifted from the optical axis, such that the beam is shifted from both the optical axis, determined with respect to the sub-scanning direction, by a predetermined distance and the center of the lens 72. When the laser beam L is incident on the first surface of the third plastic lens 72, it is refracted in the X-axis direction (sub-scanning direction) at a certain angle. When the laser beam L emerges from the second surface of the third plastic lens 72, it is again refracted in a direction different from that in which it is refracted by the first surface, and is then directed to the photosensitive body 90. On the other hand, part of the laser beam L incident on the first surface is reflected by the second surface. The reflected laser beam x is reflected by the first surface again, and becomes a ghost laser beam l. In the present invention, however, the reflected laser beam K is reflected by the first surface such that it passes through focusing point $f_m$, due to the curvature which is determined for the first surface in the sub-scanning direction. Since the reflect laser beam x reflected by the first surface is guided in a different direction from that of the major component of the laser beam L, the ghost laser beam l is divided from the laser beam L. Therefore, the ghost laser beam l is eliminated from the surface of the photosensitive body 90 by adding a light shielding element (not shown).

The reason why the ghost laser beam l can be eliminated in the present invention will be explained in more detail.

As mentioned above, the third plastic lens 72 has different optical characteristics between the portion which is center in the main scanning direction and the portions which are peripheral in the main scanning direction. With respect to this third plastic lens 72, let it be assumed that: M denotes a central portion of the lens 72 in the main scanning direction; N denotes the peripheral portions of the lens 72 where the angle of rotation of each mirror 68 will be larger; $S_{Mi}$ denotes a surface portion which is center with respect to the main scanning direction and on which a laser beam L is incident; $S_{Ni}$ denotes surface portions which are peripheral with respect to the main scanning direction and on which the laser beam L is incident; $S_{Mo}$ and $S_{No}$ denote surface portions from which the laser beam L emerges; $f_M$ and $f_N$ are focal lengths corresponding to the surface portions $S_{Mi}$ and $S_{Ni}$, respectively; and $r_M$ and $r_N$ are radii determining the curvatures of the surface portions $S_{Mi}$ and $S_{Ni}$, respectively. In this case, the focal lengths $f_M$ and $f_N$ are expressed as follows:

$$f_M = r_M/2$$

$$f_N = r_N/2$$

Let it be also assumed that: $L_M$ denotes a laser beam which passes through a portion located in the vicinity of the optical axis determined with respect to the main scanning direction; $L_N$ denotes a laser beam which passes through peripheral portions determined with respect to the main scanning direction; $l_M$ denotes a ghost laser beam produced by the laser beam L incident in the vicinity of the optical axis determined with respect to the main scanning direction; $l_N$ denotes a ghost laser beam produced by the laser beam L incident on the peripheral portions determined with respect to the main scanning direction; and $\psi_M$ and $\psi_N$ denote angles at which the ghost laser beams $l_M$ and $l_N$ are inclined with reference to the major components of laser beams $L_M$ and $L_N$. In this case, inclination angles $\psi_M$ and $\psi_N$ are given by:

$$\psi_M = \Delta X_{3M} \times 2/r_M$$

$$\psi_N = \Delta X_{3N} \times 2/r_N$$

It should be noted that the inclination angles $\psi_M$ and $\psi_N$ are in inverse proportion to the radius r of curvature of each portion of the curved surface of the third plastic lens 72. Therefore, the inclination angle $\psi$ of the ghost laser beam $l_M$ is wide in the region where the value of r is small, i.e., the regions in the neighborhood of the center determined with respect to the main scanning direction, while the inclination angle $\psi_N$ of the ghost laser beam $l_N$ is narrow in the region where the value of r is large, i.e., the region in the neighborhood of the peripheral portions determined with respect to the main scanning direction. It should be also noted that the inclination angles $\psi_M$ and $\psi_N$ are in proportion to the deviation of the intersection between the optical axis of the third plastic lens 72 and the laser beam L. Therefore, in the case where the third plastic lens 72 has its optical axis shifted in the direction of the displacement, the value of $\Delta X_3$ varies in accordance with a change in the rotating angle $\theta$ of each mirror 68 of the polygonal mirror 66. Thus, $|\Delta X_3|$ is small in the portions where r is small, and is large in the portions where r is large.

In the embodiment of the present invention, the optical axis of the third plastic lens 72 is shifted from the major component of the laser beam L, as mentioned above. In this case, the angle between the ghost laser beam l and the laser beam L is large if the absolute value of the displacement $\Delta X_3$ is large ($\Delta X_{3N}$), and is narrow if the absolute value of the displacement $\Delta X_3$ is small ($\Delta X_{3M}$). In other words, the distance $\Delta X_3$ ($\Delta X_{3N}$) between the major component of the laser beam passing through the third plastic lens 72 and the optical axis of the third plastic lens 72 is long in the region where the angle $\theta$ of rotation of each mirror 68 of the polygonal mirror 66 is large, whereas the distance $\Delta X_3$ ($\Delta X_{3M}$) between the major component of the laser beam passing through the third plastic lens 72 and optical axis O' of the third plastic lens 72 is small in the region of the lens center. Therefore, when the laser beam L focused o the photosensitive body 90 is made to move straight line parallel to the main scanning direction, the ghost laser beam l ($l_M, l_N$) can be eliminated from even all surface of the third plastic lens 72 while simultaneously suppressing the shifting of the third plastic lens 72.

In regard to the sub-scanning direction, the angle of incidence at which the laser beam L is incident on the third plastic lens 72 is considered substantially 0°. Therefore, the sectional shape of the laser-emerging side of the third plastic lens 72 can be substantially flat in the sub-scanning direction.

The graph shown in FIG. 7 shows how the field curve and the f$\theta$ characteristic are corrected by setting an optimal deflection angular velocity. The deflection angular speed is determined by the angle $\theta$ of rotation of the polygonal mirror 66 or the mirror 68 and by the angle $\psi$ formed between the major component of the laser beam L and the optical axis 0 of the third plastic lens 72.

In the case of the present embodiment it is known that the relationship below is established with respect to the surface of an object to be scanned, $$h(t) = f\tan\psi$$

: where t is a time.

If the value of dh/dt is assumed to be constant and if h(t) = $f\tan\psi$, then the following formula is obtained:

$$dh/dt = dh/d\psi \times d\psi/dt$$

Therefore, it can be understood that one of the conditions which improve the field curve and the f$\theta$ characteristic to satisfy the relationship expressed by the following formula:

$$dh/dt = f\sec^2\psi \times d\psi/dt$$

In order to allow the value of dh/dt to become constant, the following formula should be established:

$$d\psi/dt = k_1\cos^2\psi(t) \qquad \text{I}$$

: $K_1$ is a constant.

Let it be assumed that the angular velocity of the polygonal mirror 68 is $\omega$ without reference to the value of t. In this case, t is expressed as below.

$$t = (1/\omega) \times \theta$$

Hence, $$t = \frac{dt}{d\theta} = \frac{1}{\omega}$$

Therefore, the above formula I can be rewritten as follows:

$$d\psi/d\theta = K\cos^2\psi (0° < \theta < 45°). \qquad \text{II}$$

: K is a constant.

The deflection angular velocity (d$\psi$/d$\theta$) obtained by this formula II is represented by the curve in FIG. 7. Incidentally, straight line A in FIG. 7 corresponds to the case where the mirrors 68 of the scanner 50 are flat, and curve B corresponds to the case where the mirrors 68 of the scanner 50 are convex, as in the present invention.

In the embodiment, the third plastic lens 72 incorporated in the optical unit is a kind of an f$\theta$ lens. Thus, the deflection angular velocity of the polygonal mirror 66 is determined in accordance with the characteristics of the third plastic lens 72 in such a manner that it falls within the region between curves C and B in FIG. 7 (curve C: a curve which is as similar as possible to straight line A). In other words, the improvement of both the field curve and the f$\theta$ characteristic are simultaneously achieved by determining the deflection angular velocity d$\psi$/d$\theta$ in accordance with the correction characteristics of the third plastic lens 72 such that the deflection angular velocity is within the region between curves C and B.

Figure 8A:
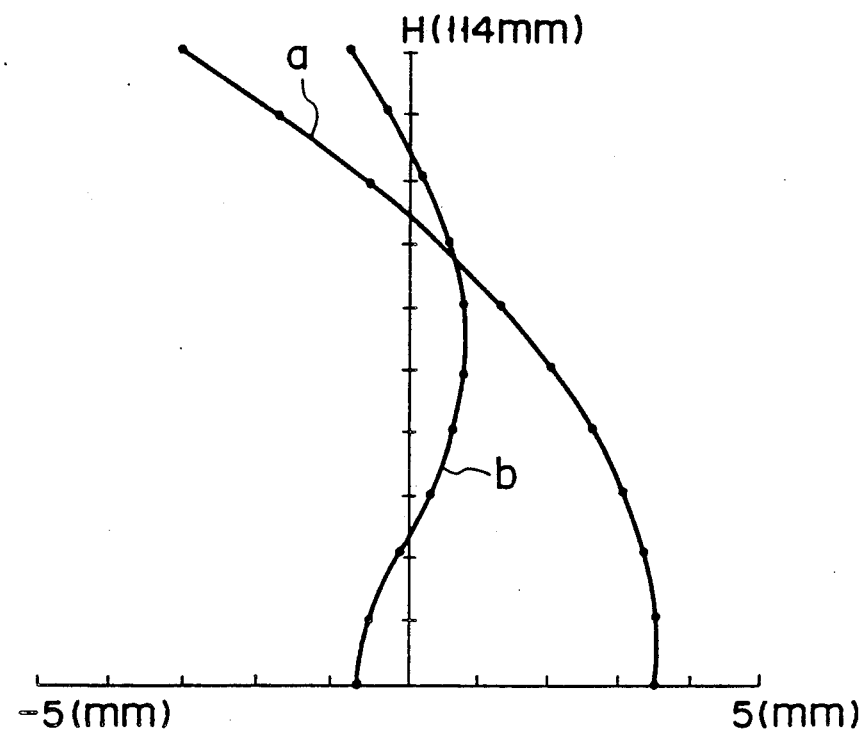
FIGS. 8A and 8B are graphs showing how the field curve and the fθ characteristic change due to the fact that the focusing lens and mirror shown in FIGS. 5–7 are employed.
Figure 8B:
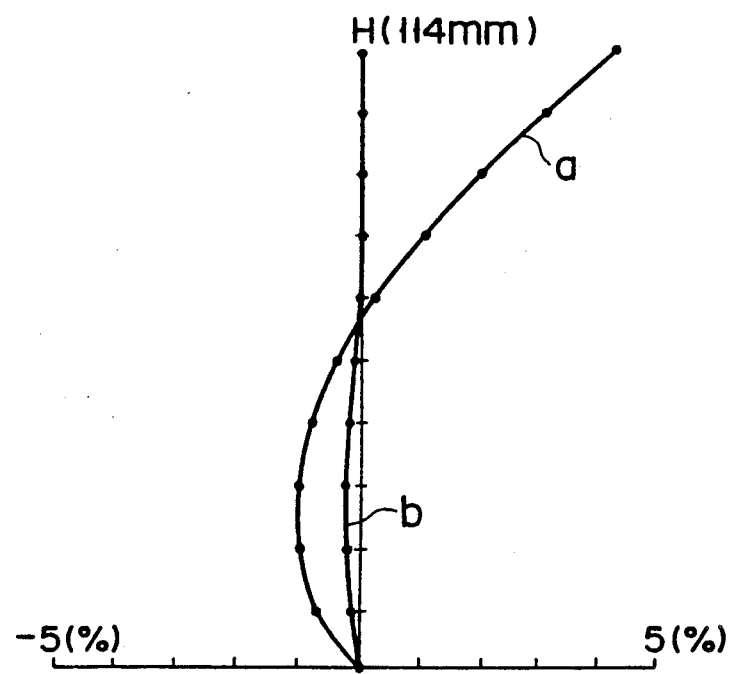

FIGS. 8A and 8B show how the field curve and the f$\theta$ characteristic are improved by the deflection angular velocity d$\psi$/d$\theta$ is satisfy. In FIGS. 8A and 8B, curves a represent the characteristics obtained when the polygonal mirror 66 is used alone, while curves b represent the characteristics obtained when the polygonal mirror 66 and the third plastic lens 72 are used in combination.

As mentioned above, according to the present invention, both the f$\theta$ characteristic and the field curve can be simultaneously improved by combining the scanner including convex mirrors with a kind of f$\theta$ lens having a toric surface. In addition, the adverse effects which may be caused by mirror tilting are eliminated, so that a laser beam scanning the surface of the photosensitive body is prevented from swaying or wavering. Since the second optical system is only required to include a single lens, the size of the entire optical unit can be small. It should be also noted that the cost needed to manufacture the optical system can be remarkably reduced since the f$\theta$ lens is a plastic lens which can be easily formed with high precision.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:
1. An optical unit, comprising:
    generating means for generating a light beam;

guiding means, including a plurality of rotatable reflecting faces which are convex in a main scanning direction, for guiding said light beam generated by said generating means toward an object in accordance with rotation of said reflecting faces; and shaping means for shaping said light beam guided by said guiding means to have a cross section of a predetermined diameter, to direct said light beam to travel at a constant velocity to said object in correspondence to a rotating angle of said reflecting faces, and maintaining said light beam to have substantially the same cross section, said shaping means having a member satisfying the relationship below, $$|K| > d\psi/d\theta > |K|\cos\psi (0° < \theta < 45°)$$

where $\psi$ is an angle formed between a center of said light beam guided by said guiding means and an optical axis of said shaping means;

$\theta$ is an angle of rotation of one of said reflecting faces of said guiding means; and K is $d\psi/d\theta$ when ann angle of rotation of one of said reflecting faces of said guiding means is 0°.

2. An optical unit according to claim 1, wherein said shaping means includes at least one plastic lens.

3. An optical unit according to claim 2, wherein said plastic lens has a toric surface facing said guiding means.

4. An optical unit according to claim 3, wherein said toric surface of said lens facing said guiding means is rotation-symmetric with reference to an axis extending in said main scanning direction, said plastic lens further having an aspheric surface which faces said object and and which is rotation-symmetric with reference to said optical axis.

5. An optical unit according to claim 3, wherein said toric surface of said lens facing said guiding means is rotation-symmetric with reference to an axis extending in said main scanning direction, said toric surface having a cross section which is concave in a plane expanding in said main scanning direction and which is convex in a plane expanding in a sub-scanning direction.

6. An optical unit according to claim 1, wherein each of said reflecting faces of said guiding means has a cross section which satisfies the relationship below in said main scanning direction, ps
$R < 0.5Z_O$ where R is a maximum radius of curvature of each of said reflecting surfaces, and $Z_O$ is a shortest optical distance between a point of reflection one of said reflecting faces and a predetermined position on said object.

7. An optical unit according to claim 1, wherein said generating means, said guiding means and said shaping means are integrally assembled together.

8. An optical unit according to claim 1, wherein each of said reflecting faces includes a cylindrical surface having a predetermined radius.

9. An optical unit, comprising:

generating means for generating a light beam;

converting means for converting said generated light beam into a convergent light beam, said converting means including a glass lens located on a beam-incident side, a first plastic lens having negative power in a main scanning direction and a second plastic lens having positive power in said main scanning direction and negative power in a sub-scanning direction;

guiding means, including a convex reflecting face, for guiding said light beam converted by said converting means toward an object in accordance with rotation of said reflecting face; and shaping means for directing said light beam to travel at a constant velocity toward a predetermined portion of said object which corresponds to a rotating angle of said reflecting face of said guiding means and for shaping said light beam to have a beam spot of a constant diameter on said predetermined portion of said object, said shaping means including a member satisfying the relationship below, $$|K| > d\psi/d\theta > |K|\cos^2\psi (0° < \theta < 45°)$$

where $\psi$ is an angle formed between a center of said light beam guided by said guiding means and an optical axis of said shaping means;

$\theta$ is an angle of rotation of said reflecting face of said guiding means; and K is $d\psi/d\theta$ when an angle of rotation of said reflecting face of said guiding means is 0°.

10. An optical unit according to claim 9, wherein said generating means, said converting means, said guiding means and said shaping means are integrally assembled together.

* * * * *